(12) United States Patent
Bowler et al.

(10) Patent No.: US 9,325,883 B2
(45) Date of Patent: Apr. 26, 2016

(54) MULTI FIELD OF VIEW IMAGING SYSTEM

(75) Inventors: Dennis P. Bowler, Sudbury, MA (US); Steven J. Wein, Sudbury, MA (US); David J. Korwan, Westford, MA (US); James D. Targove, Lunenburg, MA (US); Gerard M. Perron, Acton, MA (US)

(73) Assignee: BAE Systems Information and Electronic System Integration Inc., Nashua, NH (US)

( * ) Notice: Subject to any disclaimer, the term of this patent is extended or adjusted under 35 U.S.C. 154(b) by 729 days.

(21) Appl. No.: 13/604,657

(22) Filed: Sep. 6, 2012

(65) Prior Publication Data

US 2013/0063552 A1 Mar. 14, 2013

Related U.S. Application Data

(60) Provisional application No. 61/532,699, filed on Sep. 9, 2011.

(51) Int. Cl.
*G02B 13/06* (2006.01)
*H04N 5/225* (2006.01)
*H04N 5/232* (2006.01)

(52) U.S. Cl.
CPC ........... *H04N 5/2254* (2013.01); *H04N 5/2259* (2013.01); *H04N 5/232* (2013.01)

(58) Field of Classification Search
USPC ............................................. 348/36
See application file for complete search history.

(56) References Cited

U.S. PATENT DOCUMENTS

| | | | | |
|---|---|---|---|---|
| 2006/0016961 A1* | 1/2006 | Oda | ...................... | H04N 5/3572 250/208.1 |
| 2007/0252074 A1* | 11/2007 | Ng | ...................... | G02B 3/0056 250/208.1 |

OTHER PUBLICATIONS http://www.dpreview.com/reviews/fujifilms5pro.*

* cited by examiner

*Primary Examiner* — Jefferey Harold
*Assistant Examiner* — Sihar Karwan
(74) *Attorney, Agent, or Firm* — Prakash Nama; Global IP Services, PLLC; Daniel J. Long

(57) ABSTRACT

A multi field of view (FOV) imaging system is disclosed. In one embodiment, a dual FOV imaging system includes a composite lens array including a first lens set positioned to focus a first type of FOV and a second lens set positioned to focus a second type of FOV and a composite focal plane array (FPA) including multiple focal plane arrays (FPAs). Further, the composite FPA is disposed at the first type of FOV and the second type of FOV for producing a seamless mosaic dual FOV image of a target region.

14 Claims, 1 Drawing Sheet

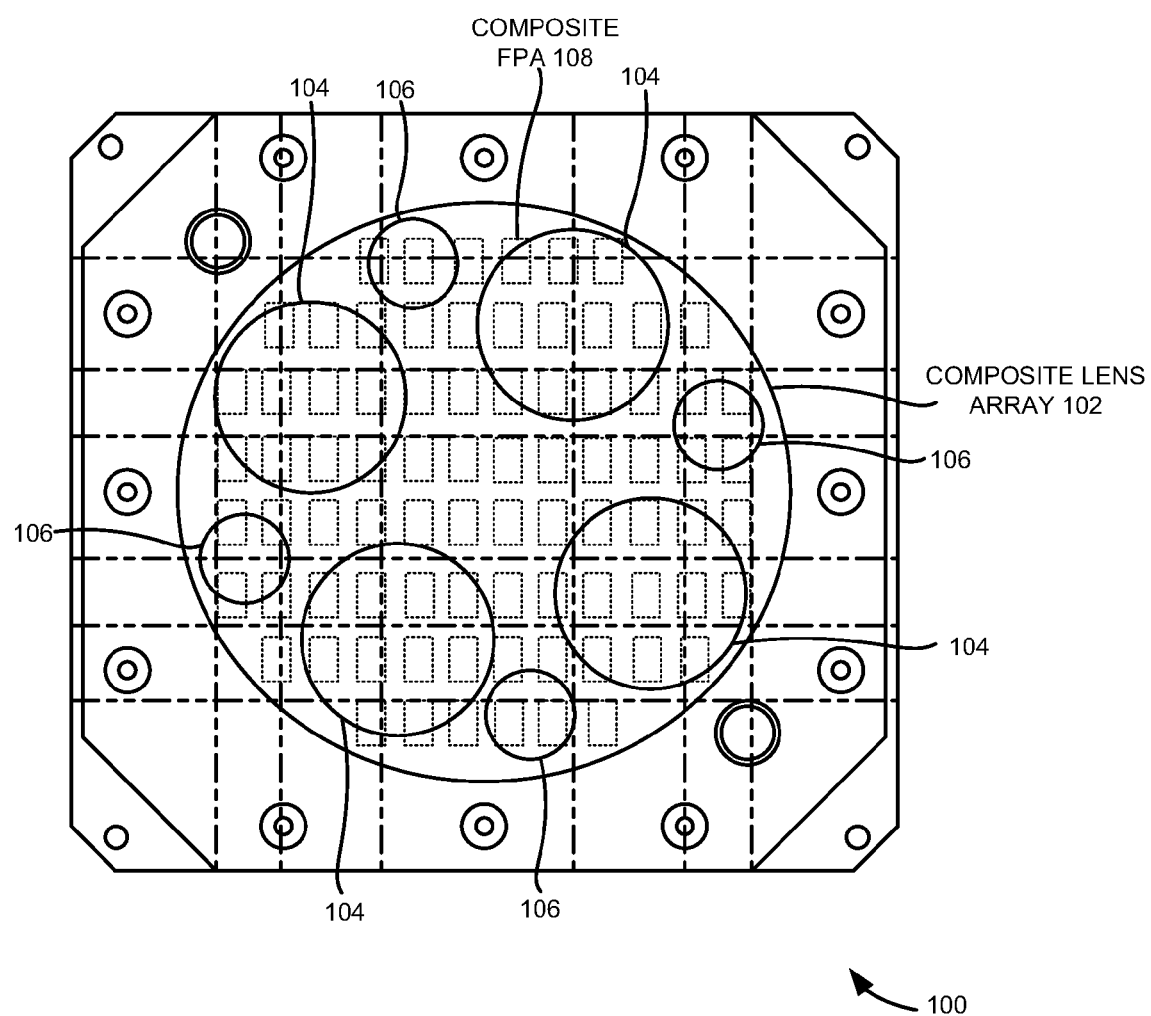

MULTI FIELD OF VIEW IMAGING SYSTEM

CROSS-REFERENCE TO RELATED APPLICATIONS

This Application claims rights under 35 USC §119(e) from U.S. Application 61/532,699 filed Sep. 9, 2011, the contents of which are incorporated herein by reference.

BACKGROUND OF THE INVENTION

1. Field of the Invention

The present application relates to optical sensors and more particularly to optical sensors having multiple fields of view.

2. Brief Description of Related Art

Modern high-resolution wide field of view (FOV) imaging systems are important tools for large area observation and target tracking. Recording high-resolution data over a wide FOV allows any number of targets within the imaging system's large observable area to be individually tracked by digitally zooming in on each target within the image. However, such imaging systems often generate an overwhelming quantity of data, limiting their use to large, expensive host platforms with powerful processing systems. Unfortunately, many desirable host platforms are smaller, less expensive, and possess insufficient processing power to operate such tracking systems.

There are two traditional alternatives to such high-resolution wide FOV imaging systems. First, a lower-resolution wide FOV camera can be used to capture data. Unfortunately, while this alternative is acceptable for tracking trucks, cars, and other larger objects, the lower resolution is insufficient for tracking smaller objects such as people or bicycles. The second traditional alternative is to capture high-resolution data over a narrower FOV. This method is disadvantageous because targets can be tracked only in a small area and once a target leaves the area covered by the narrow FOV, or multiple targets move in opposite directions, at least one of the targets is lost. Losing targets and inability to track smaller targets are undesirable traits, especially in a military context where losing a target can mean an enemy combatant or known terrorist escapes capture.

The traditional solution to this problem is to create a highly complex telecentric lens to direct the light from all directions onto the flat focal plane to obtain a very wide FOV. However, this can increase lens complexity by requiring double or more the number of elements of a typical standard lens. Such increased complexity severely increases production times, costs, and loss rates. All of these disadvantages are multiplied by the number of lenses in the system, making wide FOV systems highly expensive and difficult to make for low cost and high volume applications, such as cell phone cameras.

SUMMARY OF THE INVENTION

A multi field of view (FOV) imaging system is disclosed. According to an embodiment of the present subject matter, a dual FOV imaging system includes a composite lens array including a first lens set positioned to focus a first type of FOV and a second lens set positioned to focus a second type of FOV and a composite focal plane array (FPA) including multiple focal plane arrays (FPAs). Further, the composite FPA is disposed at the first type of FOV and the second type of FOV for producing a seamless mosaic dual FOV image of a target region.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

FIG. 1 illustrates a multi field of view (FOV) imaging system for obtaining a multi field of view, according to an embodiment of the present subject matter.

DETAILED DESCRIPTION OF THE INVENTION

The exemplary embodiments described herein in detail for illustrative purposes are subject to many variations in structure and design.

FIG. 1 illustrates a multi field of view (FOV) imaging system for obtaining a multi FOV, according to an embodiment of the present subject matter. Particularly, FIG. 1 illustrates a dual FOV imaging system 100 including a composite lens array 102 and a composite focal plane array (FPA) 108. As shown, the composite lens array 102 includes a first lens set 104 positioned to focus a first type of FOV and a second lens set 106 positioned to focus a second type of FOV. For example, the first type of FOV is a wide FOV and the second type of FOV is a narrow FOV. Further, the composite FPA 108 includes multiple FPAs. The composite FPA 108 is disposed at the first type of FOV and the second type of FOV for producing a seamless mosaic dual FOV image of a target region.

In one embodiment, the wide FOV is a lower-resolution wide FOV and the narrow FOV is a higher-resolution narrow FOV. For example, the wide FOV lens are used to create the wide FOV by focusing light onto some of the FPAs within the composite FPA 108, providing a lower-resolution wide FOV image that can be used to track larger objects and cover a large observable area. In this embodiment, four wide FOV lenses are used, in the first lens set 104, to create lower-resolution image over a 50°-60° wide FOV.

Further, each lens in the first lens set 104 and the second lens set 106 has an optical axis parallel to and offset from each other. For example, the first lens set 104 and the second lens set 106 includes two or more lens. Furthermore, the first lens set 104 is a wide view lens set and the second lens set 106 is a narrower view lens set. Also, the second lens set 106 includes at least one independently steerable narrow FOV lens. For example, the narrow FOV is established using the independently steerable, narrow view lens to focus light onto otherwise unused component FPAs within the composite FPA 108, thereby enabling high resolution tracking of one or more smaller objects within the wider, lower-resolution view. In this embodiment, four narrow FOV lenses are used, in the second lens set 106, to create high resolution images within independently steerable 2°-3° narrow FOVs.

In another embodiment, a multi FOV imaging system includes a composite lens array including multi lens sets positioned to focus associated type of multi FOVs and a composite FPA including multiple FPAs disposed at multi lens sets of the composite lens array for producing a seamless mosaic multi field of view image of a target region. In this embodiment, each lens in each of the multi lens sets has an optical axis parallel to and offset from each other. Further, one of type of FOVs is a wide FOV and another one of the type of FOVs is a narrow FOV. Furthermore, the wide FOV is a lower-resolution wide FOV and the narrow FOV is a higher-resolution narrow FOV. In addition, one of the multi lens set is a wide view lens set and another one of the multi lens set is a narrower view lens set. Also, one of the multi lens set further comprises at least one independently steerable narrow FOV lens.

In various embodiments, the dual FOV imaging system 100 described with reference to FIG. 1 enable to reduce the quantity of data captured as fewer FPAs are actively collecting data at any given time and full resolution is not required throughout the entire wide FOV. Thus, the dual FOV imaging system 100 is still capable of tracking a limited number of smaller targets despite being confined by a limited data stream.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A dual field of view (FOV) imaging system, comprising:
   a composite lens array including a first lens set positioned to focus a first type of FOV and a second lens set positioned to focus a second type of FOV, wherein the first type of FOV is a wide FOV and the second type of FOV is a narrow FOV, and wherein the second lens set comprises at least one independently steerable narrow FOV lens; and
   a composite focal plane array (FPA) including multiple FPAs, wherein the composite FPA is disposed at the first type of FOV and the second type of FOV for producing a seamless mosaic dual FOV image of a target region.

2. The dual FOV imaging system of claim 1, wherein each lens in the first lens set and the second lens set having an optical axis parallel to and offset from each other.

3. The dual FOV imaging system of claim 1, wherein the wide FOV is a lower-resolution wide FOV.

4. The dual FOV imaging system of claim 1, wherein the narrow FOV is a higher-resolution narrow FOV.

5. The dual FOV imaging system of claim 1, wherein the first lens set is a wide view lens set.

6. The dual FOV imaging system of claim 1, wherein the second lens set is a narrower view lens set.

7. The dual FOV imaging system of claim 1, wherein the first lens set and the second lens set includes two or more lens.

8. A multi field of view (FOV) imaging system, comprising:
   a composite lens array including multi lens sets positioned to focus associated type of multi FOVs, wherein one of type of FOVs is a wide FOV and another one of the type of FOVs is a narrow FOV, and wherein one of the multi lens set comprises at least one independently steerable narrow FOV lens; and
   a composite focal plane array (FPA) including multiple FPAs disposed at multi lens sets of the composite lens array for producing a seamless mosaic multi field of view image of a target region.

9. The multi FOV imaging system of claim 8, wherein each lens in each of the multi lens sets having an optical axis parallel to and offset from each other.

10. The multi FOV imaging system of claim 8, wherein the wide FOV is a lower resolution wide FOV.

11. The multi FOV imaging system of claim 8, wherein the narrow FOV is a higher-resolution narrow FOV.

12. The multi FOV imaging system of claim 8, wherein one of the multi lens set is a wide view lens set.

13. The multi FOV imaging system of claim 8, wherein another one of the multi lens set is a narrower view lens set.

14. The dual FOV imaging system of claim 1, wherein the first lens set is used to create the wide FOV by focusing light onto a set of FPAs within the composite FPA, and wherein the second lens set is used to create the narrow FOV by focusing light onto unused FPAs within the composite FPA.

\* \* \* \* \*